United States Patent [19]
McDonough et al.

[11] 4,163,629
[45] Aug. 7, 1979

[54] TURBINE VANE CONSTRUCTION

[75] Inventors: Edward C. McDonough, Lawrenceburg, Ind.; Eugene N. Tuley, Hamilton, Ohio

[73] Assignee: The United States of America as represented by the Secretary of the Air Force, Washington, D.C.

[21] Appl. No.: 864,049

[22] Filed: Dec. 23, 1977

[51] Int. Cl.² ............... F01D 25/12; F02C 7/18
[52] U.S. Cl. ............................ 415/115; 415/137
[58] Field of Search ............ 415/115, 116, 117, 136, 415/137, 160; 416/96 A, 97 A

[56] References Cited
U.S. PATENT DOCUMENTS

| | | | |
|---|---|---|---|
| 2,807,433 | 9/1957 | Halford et al. | 415/137 |
| 3,075,744 | 1/1963 | Peterson | 415/137 |
| 3,240,468 | 3/1966 | Watts et al. | 415/115 |
| 3,558,237 | 1/1971 | Wall | 415/115 |

*Primary Examiner*—Louis J. Casaregola
*Attorney, Agent, or Firm*—Joseph E. Rusz; Richard J. Killoren

[57] ABSTRACT

A variable area turbine vane, for use in high temperature aircraft gas turbines, having a load carrying spar with a heat shield member surrounding the load carrying member. The heat shield member is positioned in grooves which permit spanwise and cordwise expansion of the heat shield member. Cooling air enters the hollow load bearing member and passes through holes in the load bearing member and heat shield member.

2 Claims, 6 Drawing Figures

PRIOR ART

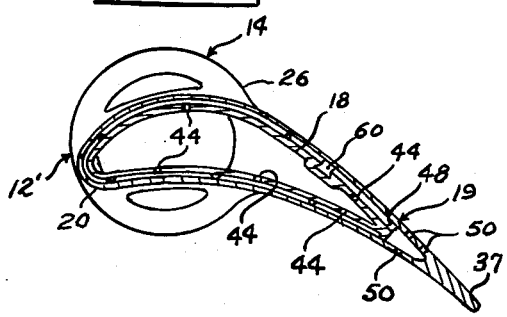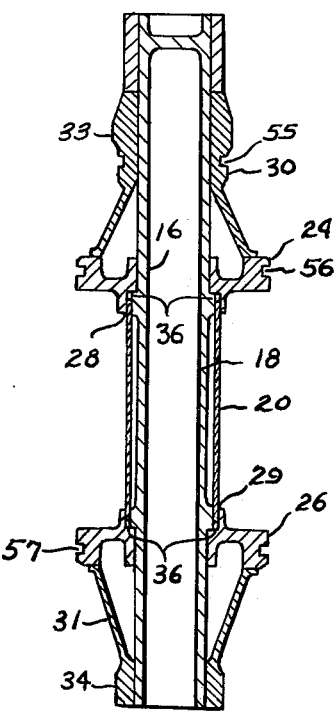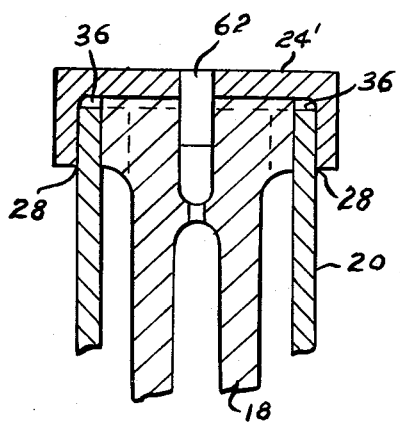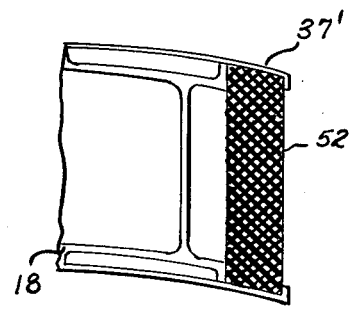

TURBINE VANE CONSTRUCTION

RIGHTS OF THE GOVERNMENT

The invention described herein may be manufactured and used by or for the Government of the United States for all governmental purposes without the payment of any royalty.

BACKGROUND OF THE INVENTION

This invention relates to a variable area turbine vane for use in high gas temperature environments.

There is a problem in providing variable area turbine vanes which will operate in a high temperature gas stream while using a minimum of cooling air.

BRIEF SUMMARY OF THE INVENTION

According to this invention a nonstructural heat shield member is positioned in grooves provided between a pair of bosses and a load carrying spar or strut member. The heat shield is not attached to the load carrying spar but is free to expand spanwise and cordwise. Small holes are provided in the load carrying member and trailing portion of the heat shield to provide a cooling air flow path.

IN THE DRAWINGS

FIG. 3 is a sectional view of the device of FIG. 2 along the line 3—3.

FIG. 4 is a sectional view of the device of FIG. 2 along the line 4—4.

FIG. 5 is an enlarged cut away sectional view of the device of FIG. 2 along the line 5—5.

FIG. 6 is a partially schematic view showing a modification of an airfoil which may be used in the device of FIGS. 2-5.

DETAILED DESCRIPTION OF THE INVENTION

Figure 1:
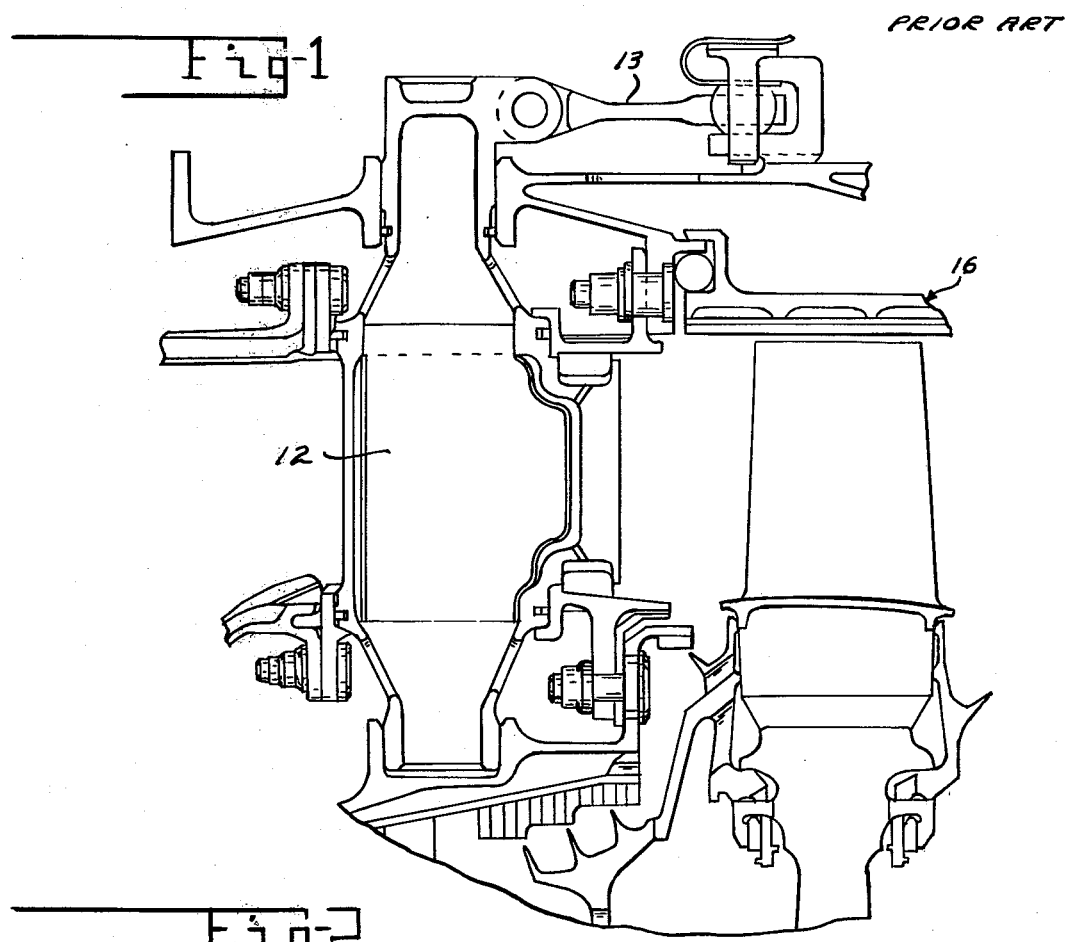
FIG. 1 shows a prior art aircraft gas generator with a variable area turbine vane.
Figure 2:
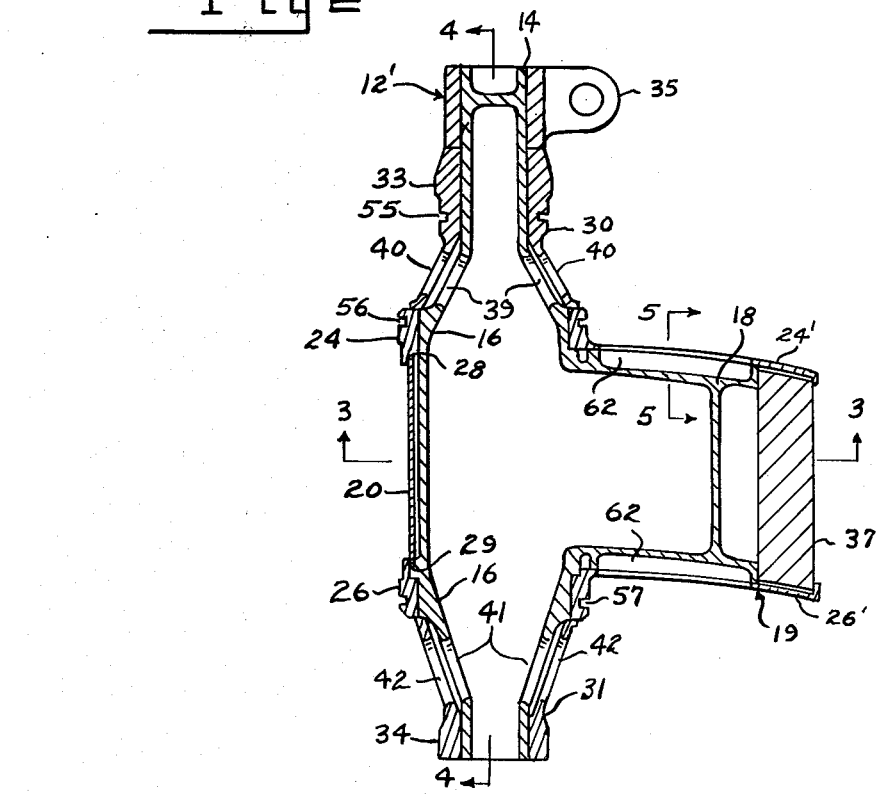
FIG. 2 shows a variable area turbine vane modified according to the invention.

Reference is now made to FIG. 1 of the drawing which shows a prior art cut away section of a gas turbine 10 having a stator vane assembly 12, which is rotatable by means of lever arm 13 to present a variable area to the gas stream.

A vane such as 12 in FIG. 1 is modified according to the invention as shown in FIGS. 2-6.

The vane assembly 12' of the invention has a central load bearing spar member 14, made of an alloy such as Rene 80, Rene 120, Mar M-509 or other high strength material. The member 14 includes a portion 18 forming an interior support for the vane airfoil 19.

A heat shield 20 surrounds member 18, but it is not a structural member. The heat shield member 20 is made of a high temperature material such as TD Nichrome, MA-274, FeCr alloy or other dispersion strengthened alloys which permit high temperature operation at relatively low stress.

The load bearing member 14 has two bosses 24 and 26 fitting around the portions 16. The bosses have projections 24' and 26' extending along the top and bottom of the vane airfoil. Slots 28 and 29 are provided between the bosses 24 and 26 and the member 18 for receiving the heat shield 20. The bosses 24 and 26 are held in place on member 16 by retainers 30 and 31 which are secured to the load bearing member 14 by brazing, welding, press fitting or with mechanical fasteners. The outer surfaces 33 and 34 of members 30 and 31 form bearing surfaces.

Lever attachment member 35 may be secured to the member 14 in the same manner as members 30 and 31. Members 30 and 35 could be made as a unitary structure.

The heat shield member 20 is free to move in slots 28 and 29 to allow for thermal expansion. Clearance 36 is also provided to allow for expansion of the heat shield member. The trailing portion 37 of the heat shield member 20 extends beyond the interior support member 18, as shown in FIG. 3.

Openings 39, 40, 41 and 42 are provided in member 14 and retainers 30 and 31 to permit cooling air to enter the hollow support member 14 as in the device of FIG. 1. The cooling air is directed onto the heat shield through a multitude of small holes in member 18 indicated schematically at 44 in FIG. 3. The cooling air can exit through passages 48 and holes 50 into the hot gas stream.

To provide for the exit of air from the interior of the vane, the trailing portion 37 of the vane can be constructed of perforated sheets as shown at 52 in FIG. 6.

Seal slots 55, 56 and 57 are provided in members 24, 26 and 30 to provide for seals as in the device of FIG. 1.

Where needed a dove tail joint 60 can be provided between the heat shield 20 and support 18 as shown in FIG. 3. This allows relative spanwise motion between members 18 and 20 on the suction side of the vane airfoil but prevents separation of the members 18 and 20 due to high pressure differential at this location.

Slots 62 are provided for a seal, not shown, to prevent cross flow from the pressure side to the suction side of the trailing region of the airfoil.

There is thus provided a turbine vane for use in high temperature aircraft wherein the surface member which encounters the hot gases is not a load bearing member which permits the selection of materials for thermal properties rather than strength.

We claim:

1. A turbine vane for use in high temperature gas turbines, comprising: a load carrying spar member including a vane airfoil support member; a heat shield member surrounding the vane airfoil support member; means for supporting the heat shield adjacent the vane airfoil support member; said means, for supporting the heat shield member, including means for permitting spanwise and cordwise thermal expansion of the heat shield member; means for providing an air cooling flow path through the vane airfoil support and the heat shield member; said means for supporting the heat shield member including a first boss supported on the load carrying spar member and a second boss supported on the load carrying spar member; said first boss having a projection extending along one end of the vane airfoil; said second boss having a projection extending along the other end of the vane airfoil; said means for permitting spanwise and cordwise thermal expansion of the heat shield member including slots formed between the vane airfoil support member and said first and said second bosses.

2. The device as recited in claim 1 including means for preventing separation of the heat shield member from the airfoil support member on the suction side of the vane airfoil.

* * * * *